United States Patent
Sbalchiero et al.

[11] Patent Number: 5,484,976
[45] Date of Patent: Jan. 16, 1996

[54] FUSING METHODS AND APPARATUS FOR USE IN MAKING DYNAMO-ELECTRIC MACHINES

[75] Inventors: Federico Sbalchiero; Sabatino Luciani; Alessandro Rossi, all of Florence, Italy

[73] Assignee: Axis USA, Inc., Tampa, Fla.

[21] Appl. No.: 130,307

[22] Filed: Oct. 1, 1993

[51] Int. Cl.⁶ .................................................. B23K 11/24
[52] U.S. Cl. ........................ 219/110; 219/92; 219/117.1
[58] Field of Search ..................................... 219/108, 110, 219/117.1, 92

[56] References Cited

U.S. PATENT DOCUMENTS

| | | | |
|---|---|---|---|
| 2,092,093 | 9/1937 | Silverman | 219/108 |
| 3,398,255 | 8/1968 | Aldenhoff | 219/108 |
| 3,573,421 | 4/1971 | Vanderheist | 219/110 |
| 4,414,455 | 11/1983 | Schneider et al. | 219/108 |
| 4,447,700 | 5/1984 | Cohen | 219/117.1 |
| 4,503,312 | 3/1985 | Nakata et al. | 219/110 |
| 4,700,042 | 10/1987 | Ferrero et al. | 219/110 |
| 4,734,556 | 3/1988 | Namiki | 219/110 |
| 4,792,656 | 12/1988 | Namiki et al. | 219/110 |
| 4,963,707 | 10/1990 | Zyokou et al. | 219/110 |
| 5,063,279 | 11/1991 | Rossi | 219/86.51 |
| 5,229,568 | 7/1993 | Gobez et al. | 219/110 |
| 5,308,948 | 5/1994 | Kawagoe et al. | 219/110 |

FOREIGN PATENT DOCUMENTS

| | | |
|---|---|---|
| 307442 | 3/1988 | European Pat. Off. ....... B23K 9/24 |
| 0480301A3 | 4/1992 | European Pat. Off. . |
| 0491578B1 | 6/1992 | European Pat. Off. . |
| 2263659 | 4/1993 | United Kingdom . |
| WO88/07430 | 10/1988 | WIPO . |

*Primary Examiner*—Clifford C. Shaw
*Attorney, Agent, or Firm*—Fish & Neave; Robert R. Jackson; Robert W. Morris

[57] ABSTRACT

In the performance of fusing operations which involve the application of force and heat to a workpiece, the heat being generated at least in part by electrical resistance heating resulting from passage of an electrical current through an electrical circuit which includes the workpiece and typically also a fusing electrode, the fusing cycle is controlled at least in part on the basis of measurements of the resistance of the above-mentioned circuit during the fusing operation. If desired, the resistance measurements may be corrected to eliminate or at least substantially reduce the contribution of electrode resistance so that the fusing operation is controlled on the basis of the resistance of the workpiece.

11 Claims, 8 Drawing Sheets

FUSING METHODS AND APPARATUS FOR USE IN MAKING DYNAMO-ELECTRIC MACHINES

BACKGROUND OF THE INVENTION

This invention relates to methods and apparatus for fusing electric conductors together, and more particularly to such methods and apparatus when employed in making dynamo-electric machines such as electric motors and generators.

Fusing (also sometimes referred to as hot staking) is a well known process used in the manufacture of dynamo-electric machines for such purposes as mechanically and electrically connecting the leads of armature coils to tangs on or slots in the commutator of the armature. Fusing may similarly be used for mechanically and electrically connecting stator coil leads to terminations on the stator. The typical fusing process involves the application of force and heat to at least one of two (or more) electrical conductors to be connected. The heat removes insulation (e.g., wire insulation) from the conductors. The heat also helps to soften the conductors so that they can be more easily deformed into close and intimate contact with one another. Force is used (as the foregoing suggests) to deform the conductors into intimate contact with one another.

A fusing operation is typically carried out by placing a fusing electrode and a ground electrode in contact with at least one of the conductors to be connected. Heat is generated by passing an electrical current through the series circuit including the fusing electrode, the workpiece, and the ground electrode. The fusing electrode is forced against the workpiece to produce the workpiece deformation required as part of the fusing operation.

While it is important to ensure that there is enough heat and force to remove all insulation and produce a tight mechanical and electrical connection, it is also important to avoid any significant melting of the conductors during the fusing operation. It may also be important to avoid overheating dynamo-electric machine structures adjacent to the fusing site. For example, commutator bars being fused to coil leads may be embedded in a mass of resin which it is important not to overheat.

In recent years increasing attention has been given to the fusing step or steps involved in the manufacture of dynamo-electric machines. This has been due to several factors such as the desire to improve the quality of fused connections, the desire to increase production rates, and the need to avoid overheating of the more heat-sensitive resin materials now being used in place of asbestos materials to support the commutator bars in armatures. Reducing fusing cycle time tends to increase production rates and may help avoid overheating of adjacent structures, but it may also make it more difficult to maintain or improve the quality of the resulting connections. At the very least, shorter fusing cycle time requires more careful control of the parameters of the fusing cycle in order to ensure that the desired mechanically tight connections of low electrical resistance with no residual insulation remaining in the connection are produced.

In view of the foregoing, it is an object of this invention to facilitate the provision of shorter, more efficient fusing cycles.

It is another object of this invention to provide improved controls for fusing operations so that the quality of the resulting connections can be improved and/or so that the time required to perform a fusing cycle can be reduced.

SUMMARY OF THE INVENTION

These and other objects of the invention are accomplished in accordance with the principles of the invention by measuring the electrical resistance of the electrical circuit including the workpiece through which electrical current is passing as part of a fusing operation. This resistance typically changes as the fusing operation proceeds. The resistance at any given time (either by itself or in relation to the time history of resistance during the fusing cycle which is in progress) is used as an indication of how the fusing cycle is progressing. Other parameters of the fusing cycle are then controlled based on when the resistance reaches one or more predetermined reference resistance values. For example, a relatively small test current may be passed through the circuit including the fusing electrode and the workpiece as the fusing electrode begins to be pressed against the workpiece. The resistance of the circuit including the workpiece is measured using this test current. When the resistance of the circuit drops to a predetermined reference or threshold value, indicating that firm and extensive contact between the fusing electrode and the workpiece has been established, substantially more electrical current may be applied to heat the workpiece. When the resistance of the above-mentioned circuit subsequently passes through another predetermined reference characteristic, it is known that the fusing cycle has progressed to the point that the electrical current can be changed to a different (e.g., substantially higher) level to continue the fusing operation. Another fusing cycle parameter which can be controlled on the basis of electrical resistance is the force applied to the workpiece by the fusing electrode during various phases of fusing cycle. Still another parameter which can be controlled in this way is the speed of motion of the fusing electrode. Thus electrical current, fusing cycle time, force, and electrode speed are all examples of fusing cycle parameters that can be controlled on the basis of resistance measured in the fusing circuit.

Another aspect of the invention involves determining the contribution of electrode resistance to the resistance of the circuit mentioned above in order to more accurately base fusing cycle parameters on the resistance of the workpiece per se.

Still another aspect of the invention involves relying more heavily on resistance heating of the workpiece per se by lowering the resistance of the fusing electrode as compared to conventional fusing electrode resistance.

Yet another aspect of the invention involves employing different fusing power cycles than have heretofore been used.

Further features of the invention, its nature and various advantages will be more apparent from the accompanying drawings and the following detailed description of the preferred embodiments.

BRIEF DESCRIPTION OF THE DRAWINGS

FIG. 8 also includes apparatus for measuring electrical resistance and controlling various fusing cycle parameters in accordance with this invention.

DETAILED DESCRIPTION OF THE PREFERRED EMBODIMENTS

Figure 1:
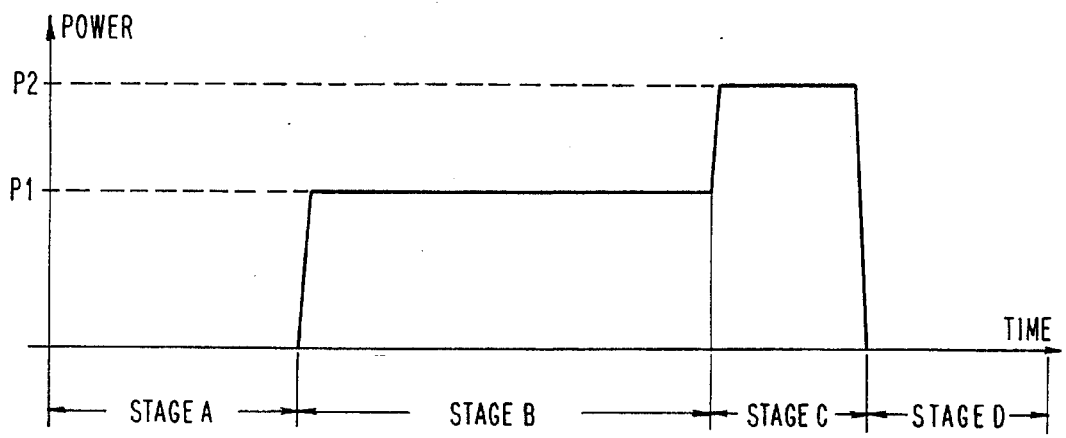
FIG. 1 is a simplified graph of the electric power aspects of an illustrative fusing cycle.

Although there are many possible fusing cycles, FIG. 1 shows the applied electrical power aspect of one possible prior art fusing cycle which can serve as a starting point for the present discussion. Similarly, although the invention is suitable for use in fusing many different types of workpieces (e.g., fusing armature coil lead wires in slots in armature commutator bars, or fusing stator coil lead wires to stator coil terminations), the invention will be fully understood from the following consideration of its application to fusing workpieces 10 of the type shown in FIG. 2 (i.e., a tang 12 on an armature commutator bar 14 with one or more armature coil lead wires 16 passing under the tang).

Figure 3:
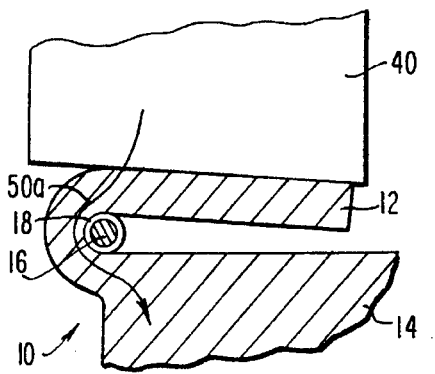
FIG. 3 is similar to a portion of FIG. 2, but shows a fusing cycle in progress.
Figure 2:
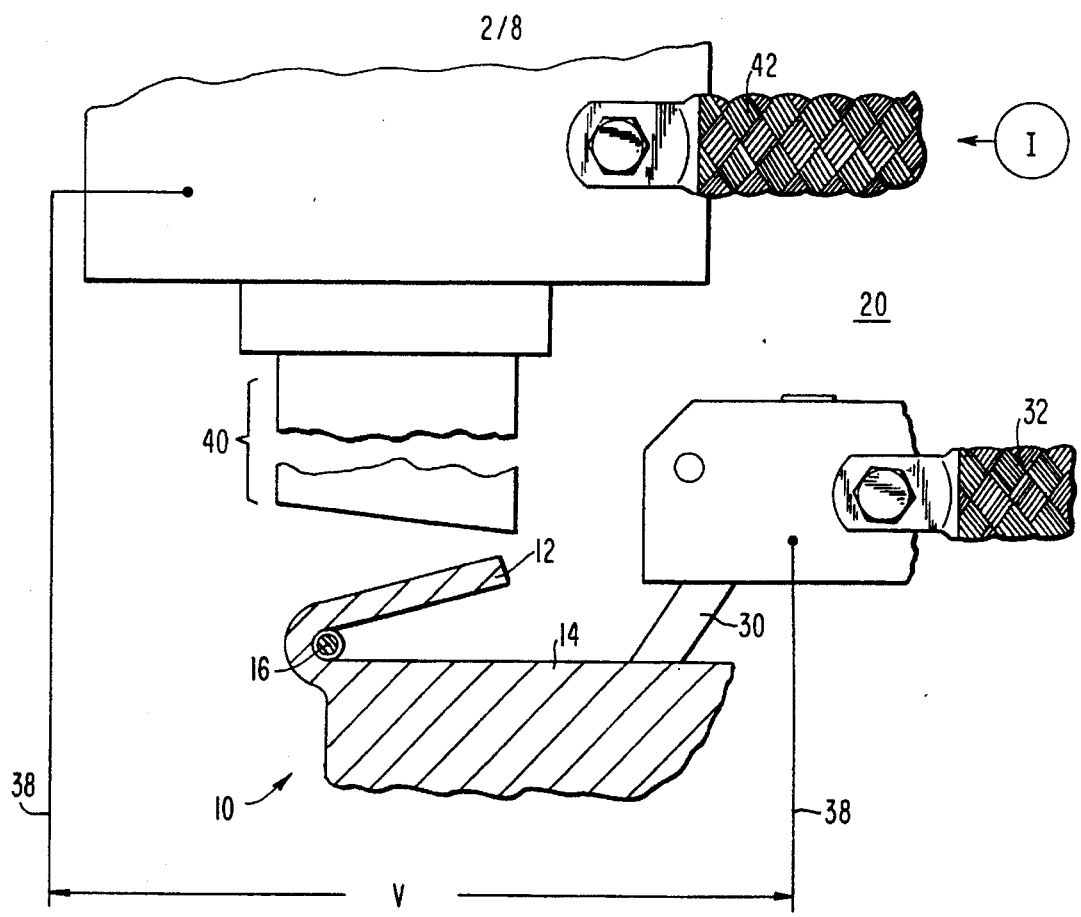
FIG. 2 is a simplified, partial, elevational view of illustrative fusing apparatus. A portion of an illustrative workpiece is also shown in section in FIG. 2.

The typical prior art fusing power cycle shown in FIG. 1 includes a first stage A during which no electrical current (power) is applied to the workpiece. During power stage A the ground electrode 30 of the fusing apparatus 20 shown in FIG. 2 is placed in contact with commutator bar 14, and fusing electrode 40 of apparatus 20 moves down into contact with tang 12. Downward force is applied by fusing electrode 40, thereby deforming tang 12 until firm and extensive contact has presumably been established between the fusing electrode and the tang as shown in FIG. 3. It is then safe to begin passing substantial electrical current through the circuit which includes (in series) fusing electrode 40, workpiece 10, and ground electrode 30. Accordingly, power cycle stage B in FIG. 1 should begin approximately when the physical condition shown in FIG. 3 has been reached.

During power stage B a first level of power P1 is applied to the circuit including elements 40, 10, and 30. The power applied to circuit 40/10/30 is given by the product of V (the potential difference between power conductors 32 and 42 in FIG. 2 (or preferably between voltage pickups 38 in that FIG.) and I (the current passing through circuit 40/10/30, which current can be measured, for example, at power conductor 42). The reason for passing current through circuit 40/10/30 is to cause resistance heating of at least one element in the circuit. Traditionally, the resistance of fusing electrode 40 was selected relative to the resistance of the other elements in the circuit so that most of the resistance heating would occur in the fusing electrode. The workpiece would then be heated by thermal conduction from the fusing electrode. At the start of power stage B all of the applied current flows through the elbow of tang 12 as indicated by the arrow 50a in FIG. 3.

Figure 4:
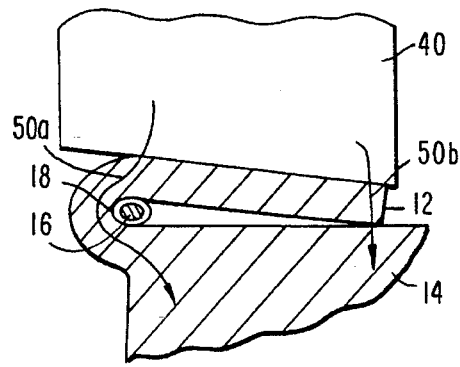
FIGS. 4–6 are similar to FIG. 3, but show successively later stages in the fusing cycle.
Figure 5:
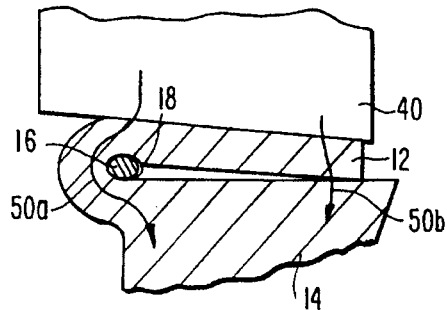

During power stage B fusing electrode 40 continues to be forced down so that tang 12 is similarly forced down toward the main portion of commutator bar 14 as shown progressively in FIGS. 4 and 5. This further deformation of tang 12 is aided by the heating of the tang which results from the flow of power P1 through circuit 40/10/30. This heat softens the material of tang 12, and also begins to vaporize and thereby remove the insulation 18 on wire 16. It should be noted, however, that in fusing it is not desired to produce any significant melting of the metal components 12, 14, and 16 being fused together. It will also be noted that at some time during power stage B the initially free end of tang 12 begins to contact the main portion of commutator bar 14 as shown in FIG. 4, thereby providing an additional current path 50b parallel to current path 50a.

Power stage B lasts for a predetermined time, presumably until the workpiece has reached a physical condition approximately like that shown in FIG. 5. Power stage C then begins.

Figure 6:
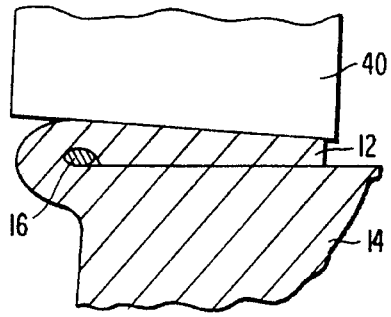

During power stage C fusing electrode 40 continues to be forced down against the workpiece and a second, higher level of power P2 is applied to circuit 40/10/30. It is safe to apply higher power P2 during stage C because all of that current does not have to flow through the relatively small elbow of tang 12 as it must during earlier phases of the fusing cycle such as are represented by FIG. 3. Higher current P2 produces even more heat to ensure complete vaporization and therefore removal of insulation 18, as well as firm, full, and complete mechanical and electrical connection or bonding between metal components 12, 14, and 16 as shown in FIG. 6 (which depicts the desired physical condition of workpiece 10 at or near the end of power stage C).

At the end of power stage C, power is turned off (as indicated by stage D in FIG. 1) so that the workpiece can begin to cool. Fusing electrode 40 may continue to be pressed against the workpiece for a time, and is then withdrawn, thereby ending the fusing operation.

As the foregoing suggests, the typical prior art fusing cycle is based exclusively or at least largely on elapsed time. Thus the fusing apparatus is typically set up so that each of stages A–D lasts a predetermined time. Stage A is set to last as long as required in the worst case for fusing electrode 40 to reach a condition of firm and extensive contact with tang 12. Stage B is set to last as long as required in the worst case for fusing electrode 40 to press tang 12 into substantial initial contact with commutator bar 14. And stage C is set to last as long as required in the worst case to complete the heating phase of the fusing operation. On the other hand, the times chosen must not be so great that too much heat is applied to the workpiece. Because the above-mentioned time settings must be based on worst case conditions, they may be longer than is needed on average. Also, the power level P1 chosen for stage B may have to be relatively conservative because the ability of circuit 40/10/30 to carry current during at least parts of that stage is only inferred from the physical conditions assumed to exist during that stage. If those assumptions are not correct, arcing or excessive current concentrations may occur to the detriment of the fusing apparatus and the workpiece.

Figure 7:
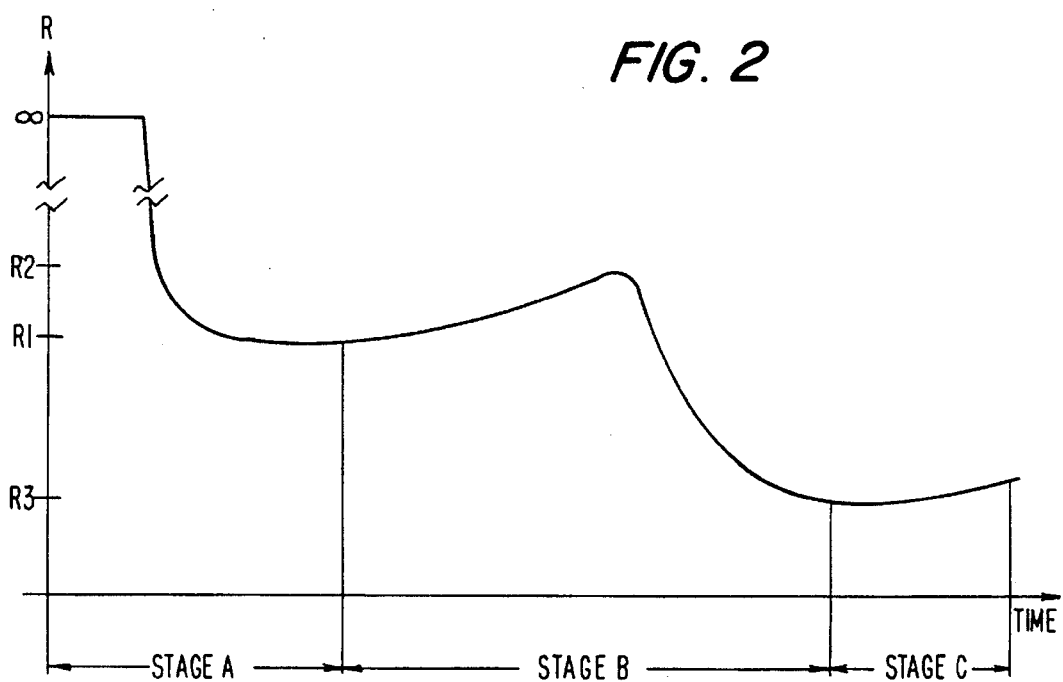
FIG. 7 is a simplified graph of electrical resistance in the circuit through which the fusing current is passed during a typical fusing cycle.

A typical diagram of electrical resistance in circuit 40/10/30 versus time is shown in FIG. 7. During the initial portion of stage A resistance is effectively infinite because fusing electrode 40 has not yet contacted tang 12. As soon as such contact is made, resistance drops rapidly and reaches reference level R1 when firm and extensive contact between electrode 40 and tang 12 is achieved as shown, for example, in FIG. 3. When stage B begins, resistance at first begins to rise (ultimately to reference level R2) due to the increase in temperature of at least some of the elements in the circuit. At some point during stage B, however, the initially free end of tang 12 begins to contact the remainder of commutator bar 14 as shown, for example, in FIG. 4. This provides an additional path of increasing extent for current flow, thereby causing resistance to decrease. At some point thereafter (when the workpiece has reached the condition shown, for example, in FIG. 5 and the resistance has fallen to reference level R3 in FIG. 7), resistance stops falling because the extent of contact between tang 12 and commutator bar 14 is not further increasing sufficiently to offset the increase in resistance due to temperature increase. Accordingly, after reaching reference level R3, resistance again begins to increase.

Figure 8:
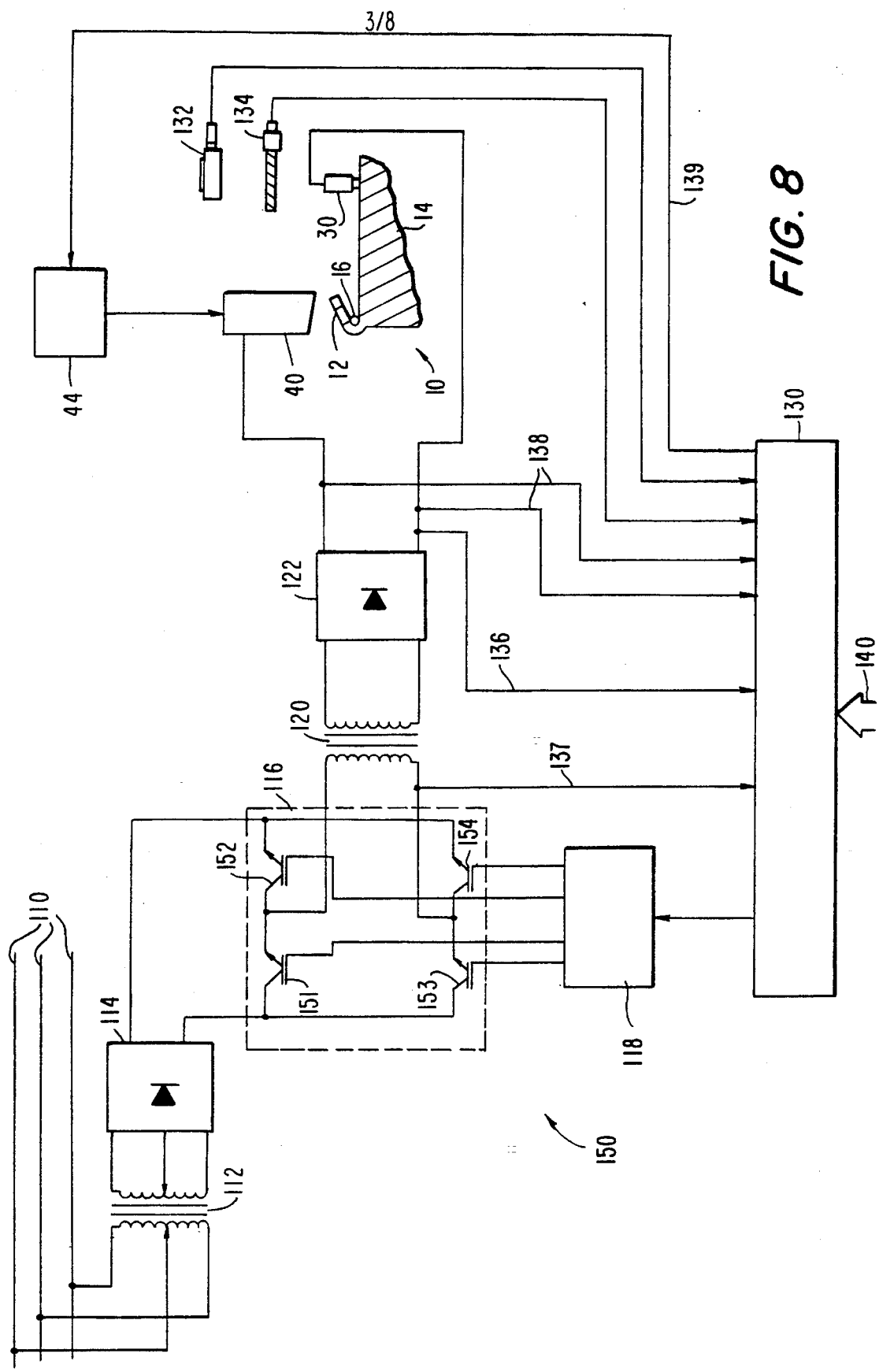
FIG. 8 is a simplified schematic block diagram of illustrative apparatus for producing electrical power for use in fusing operations.

In accordance with one possible aspect of this invention the resistance of the circuit which includes workpiece 10 can be measured and the result of that measurement used to control one or more parameters of the fusing operation. Illustrative apparatus suitable for applying electrical current and measuring electrical resistance is shown in FIG. 8. (FIG. 8 is similar to FIG. 1 in commonly assigned, co-pending patent application in Ser. No. 07/903,910, although FIG. 8 has different reference numbers (generally increased by 100) and the apparatus is used somewhat differently in accordance with the present invention. Application Ser. No. 07/903,910 is hereby incorporated by reference herein.)

With reference to FIG. 8, regulation circuit 150 receives three-phase AC power from power line 110. Transformer 112 lowers the voltage of the input signal for application to full-wave rectifying bridge 114. Rectifying bridge 114 provides a rectified signal which is relatively stable and has low ripple. The output signal of bridge 114 is applied to single-phase inverter bridge 116, which comprises transistors 151, 152, 153, and 154. As is described in more detail in application Ser. No. 07/903,910, transistors 151–154 are triggered by pulse width modulated rectangular wave form signals produced by driver 118. A typical frequency for these rectangular wave form signals is in the range from about 1 KHz to about 2 KHz.

In response to the triggering signals from driver 118, inverter bridge 116 produces a full-wave rectangular wave form signal which is applied to transformer 120. The output signal of transformer 120 is applied to single-phase full-wave rectifying bridge 122 to produce a final output signal which is applied as fusing current to the circuit including fusing electrode 40, workpiece 10, and ground electrode 30. In accordance with the present invention, this fusing current may also be used (as described below) in measuring the resistance of the circuit which includes workpiece 10.

Driver 118 (in particular the "duty cycle" or pulse width of the output signals of driver 118) is controlled by controller 130 on the basis of various inputs such as signals 136 and 137 indicating the magnitude of the current I passing through circuit 40/10/30, signals 138 indicating the magnitude of the voltage V across circuit 40/10/30, a signal from a load cell 132 in the apparatus which applies force to the workpiece via fusing electrode 40, and a signal from a position-sensing transducer 134 which monitors the displacement of fusing electrode 40. Controller 130 receives additional overall system control signals (e.g., signals for synchronizing the fusing apparatus with other apparatus) via bus 140.

Controller 130 can determine the resistance R of circuit 40/10/30 at any time by using the relationship $$R = V/I \qquad (1).$$

AS mentioned, controller 130 determines V from the potential difference between lines 138. Controller 130 determines I from line 136 or line 137. If it is desired to measure R during stage A, which is prior to the application of the relatively large currents used during fusing, the apparatus shown in FIG. 8 can apply a relatively small test current during stage A. This test current is preferably too small to cause any significant heating of the workpiece.

As mentioned above, in accordance with one possible aspect of this invention, regulation circuit 150 measures resistance R and controls one or more parameters of the fusing cycle on the basis of that measurement. For example, during stage A, rather than waiting for transducer 134 to indicate that fusing electrode 40 has moved down to a particular point at which it can be assumed that the fusing electrode has made firm and extensive contact with tang 12 so that it is safe to begin applying fusing power P1 as in FIG. 1, regulation circuit 150 may monitor resistance R as described above until R is approximately equal to R1 in FIG. 7. Regulation circuit 150 then knows that it is safe to begin to apply fusing power P1, and so circuit 150 begins to apply that power. This may allow the average length of stage A to be substantially shortened, thereby shortening the average length of the overall fusing cycle.

As another example of the foregoing principle of this invention, regulation circuit 150 may monitor the resistance R of circuit 40/10/30 during stage B in order to detect when R begins to decrease after reaching reference value R2 as shown in FIG. 7. When circuit 150 detects that R has fallen by a predetermined amount from R2, circuit 150 knows that it is safe to end stage B and begin stage C by applying increased fusing power P2 as shown in FIG. 1. Again, this may shorten the average length of stage B and therefore the entire fusing cycle.

Figure 9:
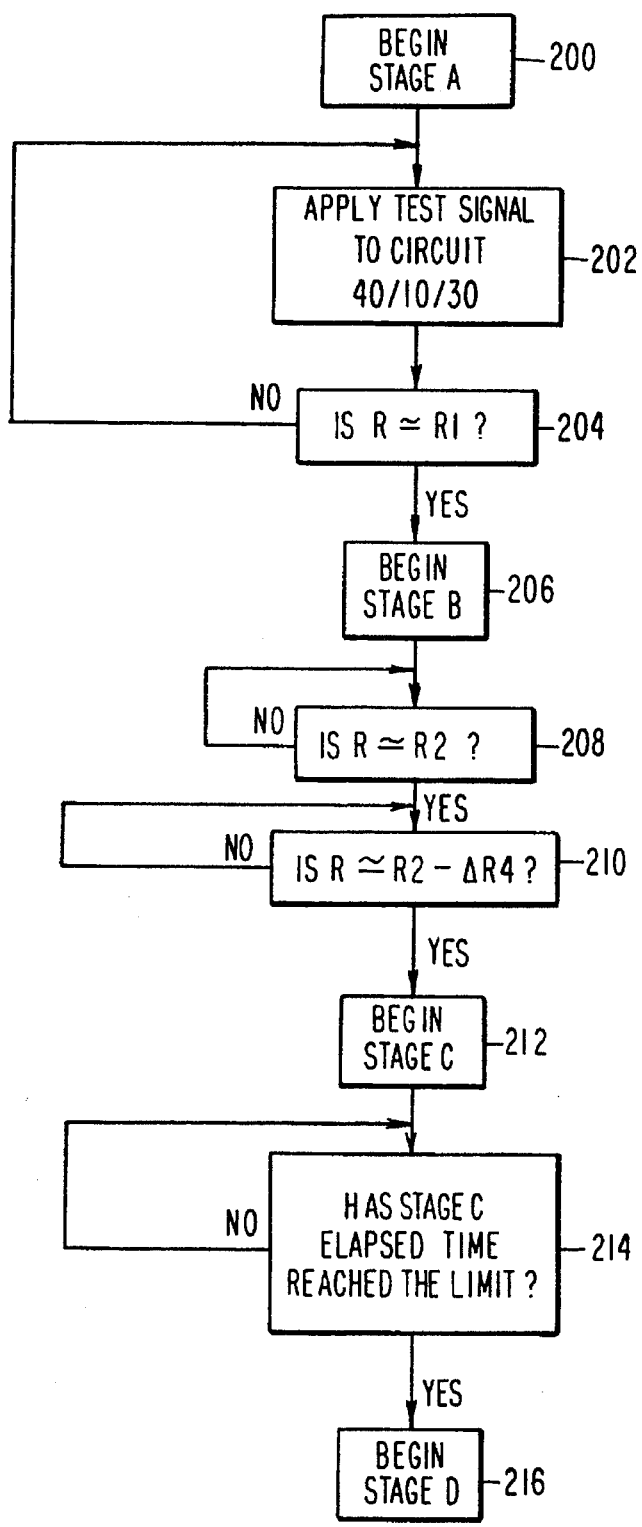
FIG. 9 is a flow chart of illustrative steps that can be carried out by the apparatus of FIG. 8 in accordance with this invention.

FIG. 9 shows illustrative steps performed by controller 130 when the fusing cycle is controlled on the basis of resistance as described above. In step 200 controller 130 begins fusing cycle stage A by producing on output lead 139 the signal required to cause actuator 44 to move fusing electrode 40 down toward workpiece 10. In step 202 controller 130 controls driver 118 to cause the circuit shown in FIG. 8 to apply a relatively low-power test signal to circuit 40/10/30. In step 204 controller 130 measures the resistance R of circuit 40/10/30 and compares the measured resistance to a predetermined reference value R1. If R is substantially greater than R1, controller 130 continues stage A. On the other hand, when R is approximately equal to R1, controller 130 moves on to step 206 in which it begins fusing cycle stage B.

During stage B controller 130 controls driver 118 to cause the circuit shown in FIG. 8 to apply fusing power at level P1 to circuit 40/10/30. Also during stage B controller 130 performs step 208 until it detects that the resistance R measured in circuit 40/10/30 has risen to approximately reference value R2. Thereafter controller 130 performs step 210 until it detects that the resistance R measured in circuit 40/10/30 has fallen to approximately R2 minus a predetermined delta R4 value. When controller 130 detects that this has occurred, controller 130 moves on to step 212 in which it begins fusing cycle stage C.

During stage C controller 130 controls driver 118 to cause the circuit shown in FIG. 8 to apply fusing power at level P2 to circuit 40/10/30. Also during stage C controller 130 performs step 214 to time the duration of stage C and to begin stage D (step 216) after stage C has continued for the desired length of time. Alternatively or in addition step 214 may stop stage C and begin stage D when the energy expended (i.e., the time integral of power) during stage C (or during stages B and C) reaches a predetermined threshold level. As still another alternative or addition to step 214, controller 130 may stop stage C and begin stage D when the amount of travel of electrode 40 (as indicated by the output signal of transducer 134) reaches a predetermined threshold level. This last possible addition to step 214 may be especially valuable as a safety precaution to prevent over-travel of fusing electrode 40 in the event that the workpiece is abnormal or has been heated more than expected.

Figure 10:
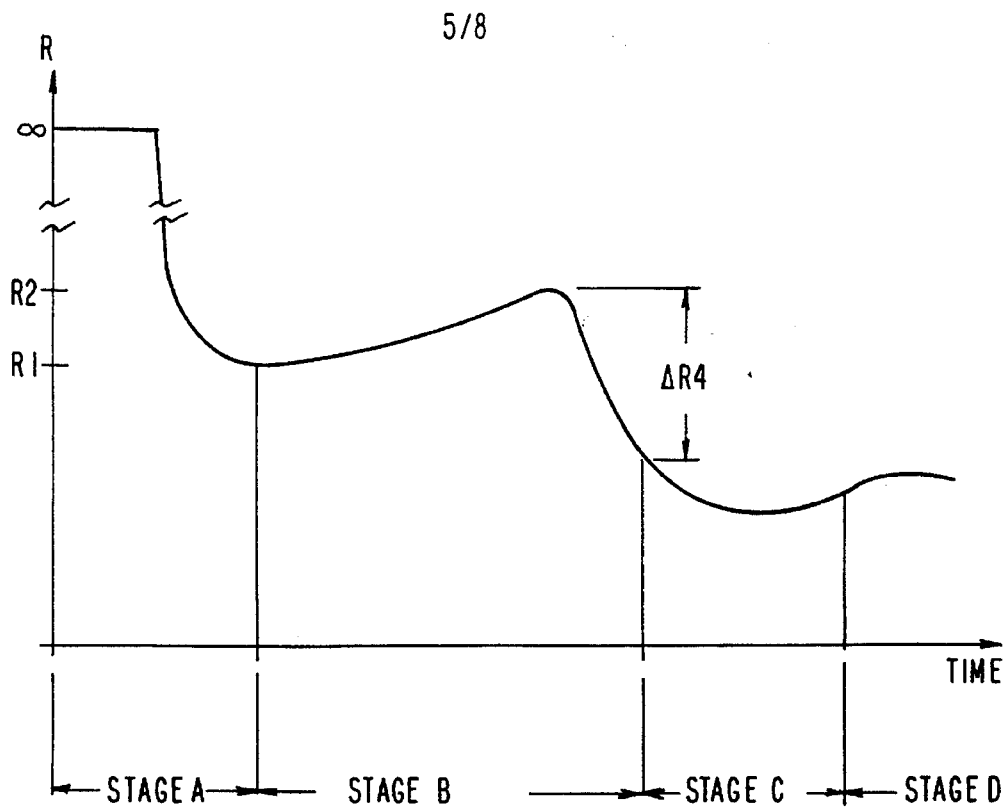
FIG. 10 is a graph similar to FIG. 7, but showing how performance of the steps of FIG. 9 results in modification of the fusing cycle illustrated by FIG. 7.

FIG. 10 shows how the resistance versus time curve of FIG. 7 can be shortened in time when the fusing cycle is performed as shown in FIG. 9 and described above. In addition to contributing to increased production rates, shorter fusing cycle time tends to reduce the amount of heat which is thermally conducted to other structures adjacent to the fusing site.

It will be understood that FIG. 9 is simplified so as not to obscure the present invention. In addition to the steps shown in FIG. 9, controller 130 may perform other steps such as timing steps to make sure that none of the fusing cycle stages lasts too long if for some reason the expected resistance characteristics are not found. Controller 130 may also perform energy measuring steps and/or displacement monitoring steps such as those mentioned above.

Another example of a fusing cycle parameter which can be controlled on the basis of measured resistance in accordance with this invention is the force exerted by fusing electrode 40 on workpiece 10. For example, it may be desired to have fusing electrode 40 apply a first relatively low level of force to workpiece 10 prior to the initially free end of tang 12 contacting commutator bar 14, and to thereafter apply substantially more force to the workpiece. Controller 130 can be programmed to detect when during power stage B the resistance R of circuit 40/10/30 begins to decrease after passing through local peak R2, and to thereafter cause the fusing electrode actuator 44 in FIG. 8 to apply substantially more force to the workpiece via electrode 40. Illustrative steps that can be performed by controller 130 to operate the fusing apparatus in this way are shown in FIG. 14.

Figure 14:
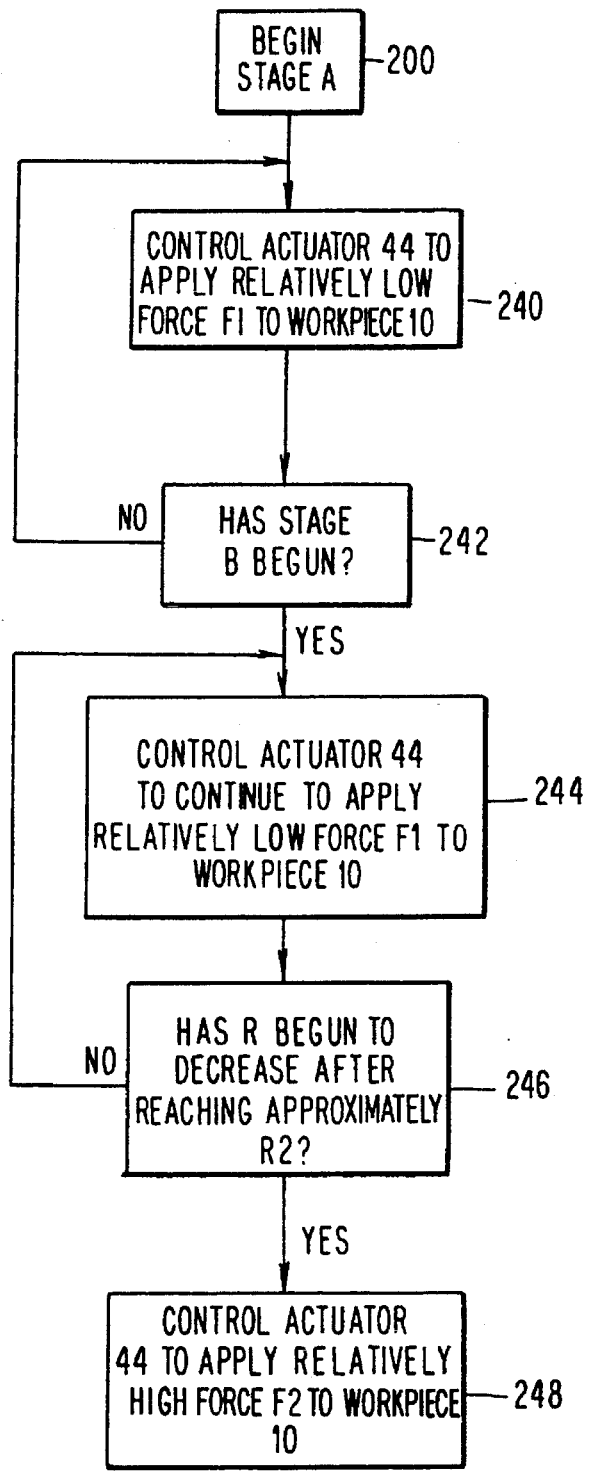
FIG. 14 is a flow chart of other illustrative steps that can be carried out by the apparatus of FIG. 8 in accordance with this invention.

Step 200 in FIG. 14 is the same as step 200 in FIG. 9. In step 240 controller 130 controls actuator 44 to cause fusing electrode 40 to apply a relatively low force F1 to workpiece 10. This continues until, as a result of performance of step 242, controller 130 knows that fusing stage B has begun. Controller 130 then moves on to step 244 which continues the application of force F1 until, as a result of the performance of step 246, controller 130 detects that the measured resistance R of circuit 40/10/30 has begun to decrease after reaching approximately reference value R2. This corresponds to the initially free end of tang 12 contacting commutator bar 14 and thereby establishing another path for current flow in circuit 40/10/30. Controller 130 then moves on to step 248 in which the controller causes actuator 44 to apply increased force F2 to the workpiece for the remainder of the fusing cycle.

The foregoing illustrates how measured electrical resistance in circuit 40/10/30 can be used to determine precisely when the workpiece can tolerate the application of substantially increased force. This in turn can be used to safely speed up the fusing cycle and/or to produce stronger fused connections.

The speed of motion of fusing electrode 40 is still another example of a fusing cycle parameter which can be controlled on the basis of measured electrical resistance in accordance with this invention. For example, it may be desired to control electrode speed (determined by actuator 44 in FIG. 8) in an inverse relationship to force as described above. Thus it may be desired to move electrode 40 relatively fast until R is approximately equal to local maximum R2 during stage B, and to thereafter move electrode 40 more slowly. It will be readily apparent how the steps shown in FIG. 14 can be modified to produce this kind of fusing electrode speed control. In particular, "high speed" replaces "low force" in steps 240 and 244, while "low speed" replaces "high force" in step 248. Again, the goal of this type of control may be to provide optimum conditions during each phase of the fusing cycle so that fusing cycle time can be reduced while improving quality or at least without sacrificing quality.

Figure 11:
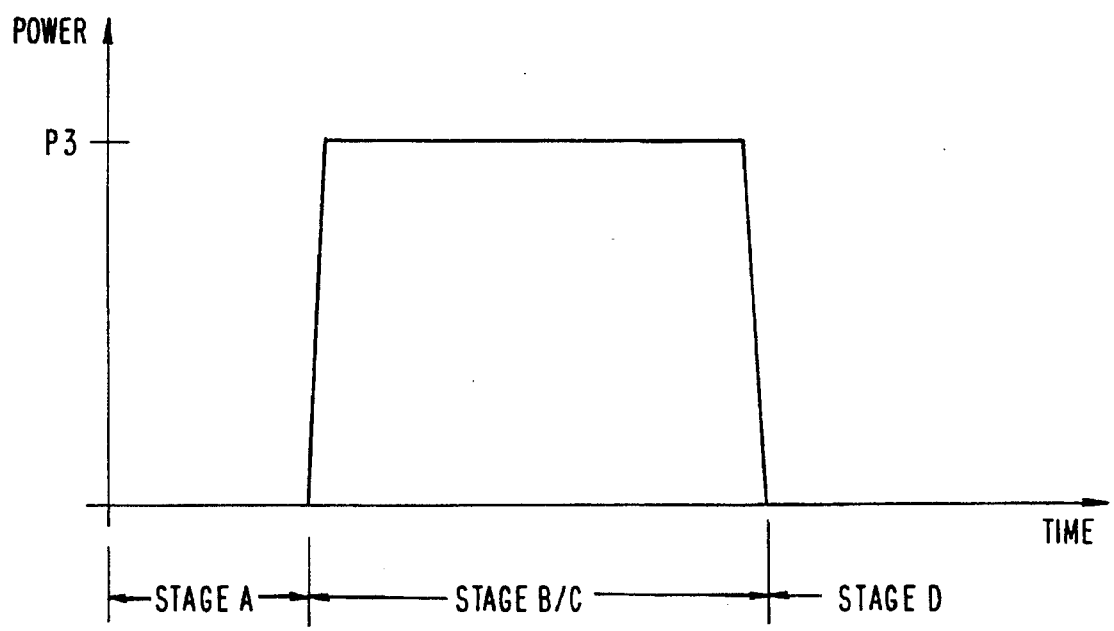
FIG. 11 is a graph similar to FIG. 1 illustrating an alternative fusing cycle in accordance with this invention.

In addition to tending to shorten the fusing cycle, the foregoing examples of the application of this invention have several other advantages. One of these advantages is that it is no longer necessary to assume from elapsed time or from force and/or displacement measurements produced by components 132 and 134 that it is safe to apply particular levels of fusing current (power), fusing force, or the like. For example, measuring the resistance of circuit 40/10/30 provides a direct indication of the ability of that circuit to carry a particular fusing current. This may enable the systems of this invention to apply more fusing power and/or to apply fusing power earlier in the fusing cycle than would otherwise be prudently or safely possible. These are additional ways in which the fusing cycle can be shortened and the results improved. For example, FIG. 11 shows that as soon as one is sure that the resistance of circuit 40/10/30 is in fact R1 (as at the end of stage A in FIG. 10), it is safe to apply fusing power at level P3 to circuit 40/10/30. P3 can be substantially higher than P1 in FIG. 1, and possibly similar to P2 in that FIG. This may allow stages B and C to be combined into one substantially shorter stage B/C, thereby further contributing to shorter overall fusing cycle time. Stage B/C in FIG. 11 may be terminated when the time integral of applied power equals a predetermined threshold value.

Figure 12:
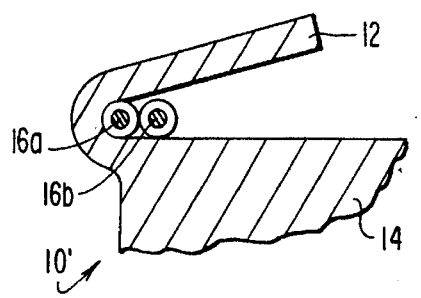
FIG. 12 is similar to a portion of FIG. 2, but shows an illustrative alternative workpiece.

Another advantage of controlling fusing cycle parameters based on measured resistance may be that it renders the fusing apparatus more independent of workpiece variations. One possible illustration of this can be described with reference to FIGS. 12 and 13. As shown in FIG. 12 some tangs 12 on an armature may have two wires 16a and 16b under them rather than one wire as in FIGS. 2–6. In all other respects workpiece 10' may be identical to a workpiece 10 with one wire. Because of the presence of more wires under the tang in workpiece 10', the various stages of the fusing cycle may tend to proceed more slowly or to take longer. For example, it may take longer for tang 12 in workpiece 10' to bend down to a condition like that shown in FIG. 3. Similarly, it may take longer for the tang in workpiece 10' to progress from a condition like that shown in FIG. 3 to a condition like that shown in FIG. 5. It may also take more time or energy to vaporize the greater amount of insulation associated with two wires rather than one wire. In conventional apparatus these considerations may make it necessary to provide different fusing cycles depending on whether the tang has one or two wires under it. This in turn may necessitate elaborate procedures for informing the fusing apparatus when it is about to fuse each type of workpiece. Controlling fusing cycle parameters based on resistance measurements in accordance with this invention may simplify this problem as will now be explained.

Figure 13:
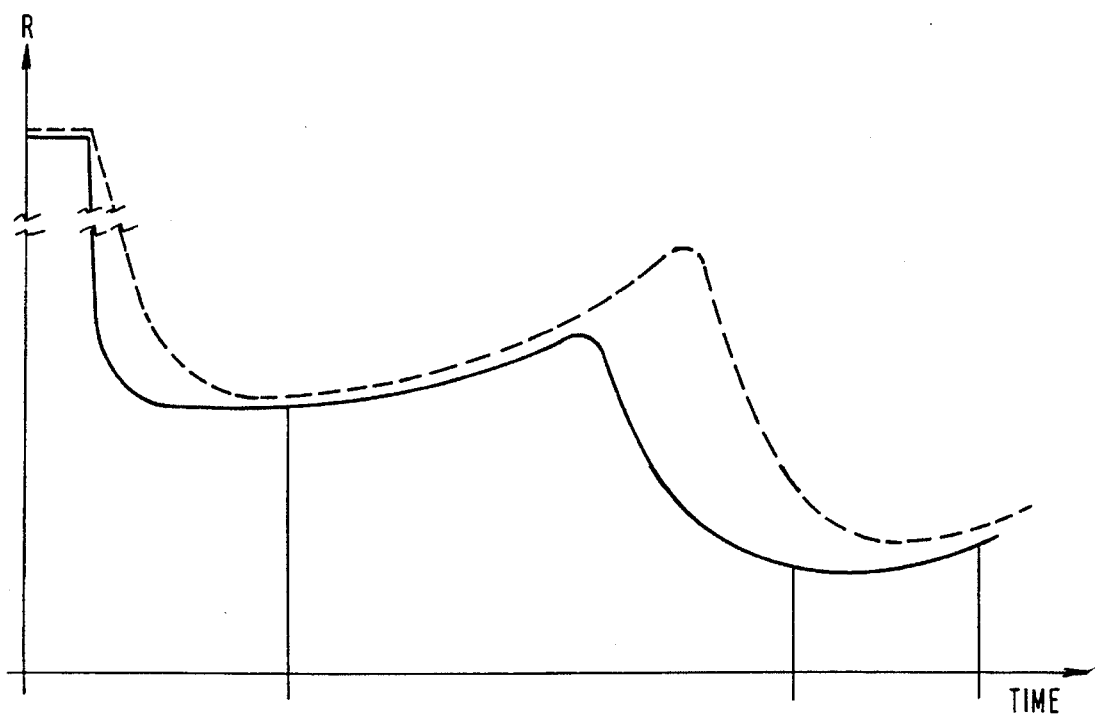
FIG. 13 repeats FIG. 7, with the addition of characteristics of the alternative workpiece of FIG. 12 shown for purposes of comparison to the FIG. 7 data.

In FIG. 13 the solid line repeats the typical resistance versus time curve for workpiece 10 from FIG. 7. The dotted line shows the typical resistance versus time curve for workpiece 10'. As FIG. 13 shows, the slower deformation of workpiece 10' causes workpiece 10' to reach particular resistance values later in time than workpiece 10. By using resistance measurement as the basis for commencing fusing cycle stage B and then fusing cycle stage C in accordance with this invention as described above in connection with FIGS. 9 and 10, the fusing apparatus automatically compensates for these different types of workpieces. This may make it unnecessary for controller 130 to be expressly programmed to provide different fusing cycles for somewhat different workpieces, or to keep track of which type of workpiece is about to be fused.

In accordance with another aspect of this invention it may be desirable to move more toward a fusing system in which applied power is controlled on the basis of power being dissipated in the workpiece. Such a system has the advantage that workpiece temperature can be more directly known and controlled. Any or all of several factors can be employed in accordance with this invention to help achieve this objective.

Prior systems maintain constant power levels such as P1 and P2 in FIG. 1 by controlling voltage and/or current such that $$P(t)=V(t)\cdot I(t)=\text{constant} \quad (2),$$

where t=time. In systems of the type shown in FIG. 8, for example, driver 118 is controlled to increase the duty cycle of its output signals when more current I must be applied to circuit 40/10/30 in order to maintain a constant value of power P. As shown in FIG. 2 it is preferable, in accordance with this invention, to place voltage pickups 38 as close to workpiece 10 as possible, but the high temperatures involved may preclude attachment of these pickups directly to electrodes 30 and 40 and may instead necessitate attachment of them to the electrode holders as in FIG. 2. (Pickups 38 in FIG. 2 may be the source of the signals on leads 138 in FIG. 8.)

The heat dissipated in a workpiece 10 having resistance Rw(t) is given by the equation $$Pw(t)=I(t)^2 \cdot Rw(t) \quad (3),$$

where again t=time. Equation (3) relates only to the resistance heating of workpiece 10 and does not include the power required to resistance heat fusing electrode 40 and ground electrode 30. Because voltage pickups 38 are typically somewhat spaced from workpiece 10 as mentioned in the preceding paragraph, the voltage V(t) measured across pickups 38 cannot be used with the measured value of I(t) to produce an exact measurement of Rw(t), the resistance of workpiece 10 per se with no resistance contribution from electrodes 30 and 40. Without an exact measurement of Rw(t) it is not possible to obtain an exact indication of the heat generated in workpiece 10 due to its resistance. This difficulty is compounded by the fact that the resistance of electrodes 30 and 40 (like the resistance of workpiece 10) changes with temperature, and temperature changes substantially as the fusing cycle proceeds.

In order to more precisely control the power applied to circuit 40/10/30 so as to cause a desired amount of electrical resistance heating in workpiece 10, the effects of electrode resistance on the control scheme are eliminated or at least substantially reduced by reducing the total resistance Rtot between voltage pickups 38 by an amount Rcorr which is substantially equal to the sum of the resistances of electrodes 30 and 40. Thus Rw(t) is given by the equation $$Rw(t)=V(t)/I(t)-Rcorr(t) \quad (4).$$

A basic value of Rcorr can be determined during a preliminary set-up phase of operation of the apparatus of FIG. 8 in which the resistance Rf of fusing electrode 40 and the resistance Rg of ground electrode 30 are measured at low temperature and with a relatively small test current. If desired, calculations can then be performed to compute how Rf and Rg will change with temperature. Rcorr is then computed as the sum of Rf and Rg. Once Rcorr has been determined, Rw(t) can be determined during each fusing cycle using equation (4). The current which the circuit of FIG. 8 must then apply to circuit 40/10/30 in order to cause a desired amount of power Pw(t) to be dissipated in workplace 10 is then determined by equation (3), which can be rewritten as follows to give I(t) directly:

$$I(t)=\sqrt{Pw(t)/Rw(t)} \quad (5).$$

The principle set forth above can be restated in more general power terms as follows: In order for a desired amount of power Pw(t) to be dissipated in workpiece 10, the power P(t) applied to circuit 40/10/30 is given by the equation:

$$P(t)=Pw(t)(1+Rcorr(t)/Rw(t)) \quad (6).$$

In other words, if the resistance Rcorr(t) of electrodes 30 and 40 is 50% of the resistance of workpiece 10 at a particular time, P(t) must be 1.5 times Pw(t) at that time in order for the power dissipated in workpiece 10 to be Pw(t). Equations (5) and (6) both make it plain that, in accordance with the features of this invention currently being discussed, the power applied to circuit 40/10/30 is based on workpiece resistance Rw(t), which can be measured and calculated as specified in equation (4). Thus in accordance with these features of the present invention, the control of fusing power is based on workpiece resistance determined at least partly by measurements taken as each fusing cycle proceeds.

If desired, the principles discussed above in connection, for example, with FIGS. 9, 10, and 13 can be based on the resistance of workpiece 10 (measured and calculated as in equation (4)), rather than on the resistance measured for the entire circuit 40/10/30 between voltage pickups 38 in FIG. 2. Thus the parameters R, R1, R2, and delta R4 in FIG. 9, for example, can all be adjusted (as per equation (4)) to eliminate or substantially eliminate the effects of electrode resistance and to represent instead resistance or resistance characteristics of only the workpiece.

In improved fusing systems of the type described herein it may be desirable to use electrodes (especially fusing electrodes) having lower resistance than has generally been characteristic of fusing electrodes. In traditional fusing, the fusing electrode has substantially higher resistance than the workpiece so that most of the electrical energy is consumed in resistance heating of the fusing electrode. The workpiece is then heated for the most part by thermal conduction from the fusing electrode. Such indirect heating tends to be less precise and controllable than direct resistance heating of the workpiece itself. It may therefore be advantageous in accordance with the present invention to lower the resistance of fusing electrode 40 to increase the proportion by which workpiece 10 is heated directly by resistance heating of the workpiece itself rather than by resistance heating of the fusing electrode followed by thermal conduction from the fusing electrode.

Figure 15:
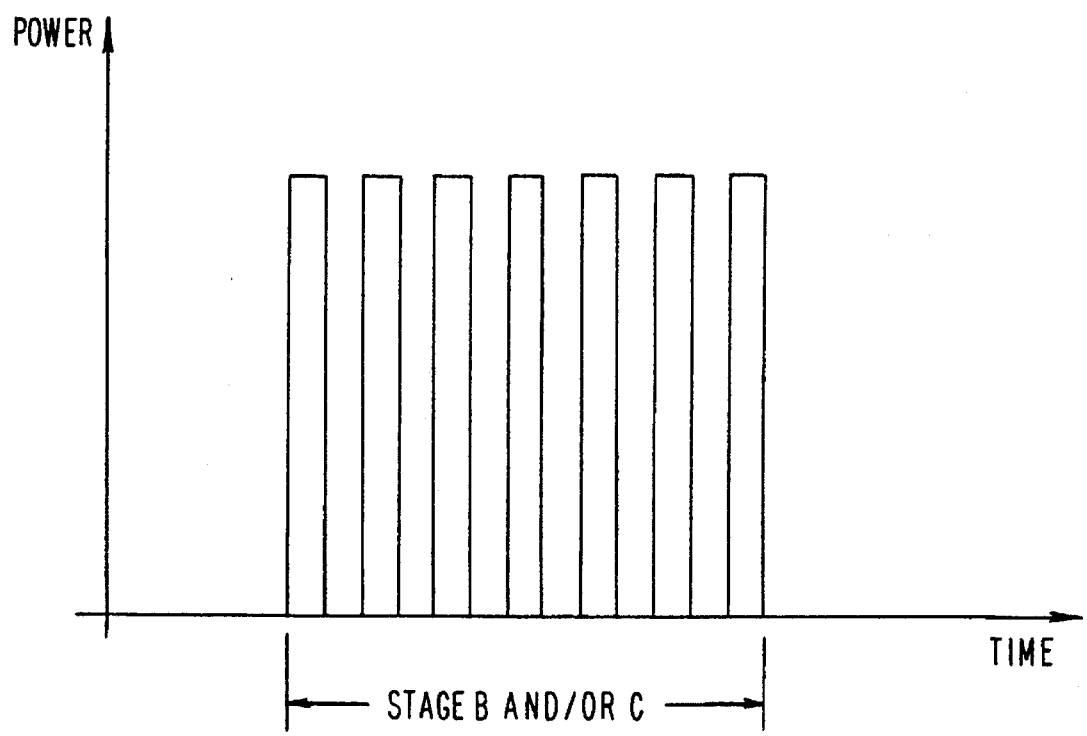
FIG. 15 is a simplified graph of the electric power aspects of an illustrative fusing cycle modified in accordance with one possible aspect of this invention.

Another possible aspect of the present invention is shown in FIG. 15. High electrical power impulses of relatively short duration are supplied, preferably at regular intervals, with a dwell period between them for cooling. (Assuming that the power impulses of FIG. 15 are produced by apparatus of the type shown in FIG. 8, each impulse in FIG. 15 comprises at least several cycles of the 1–2 KHz frequency at which driver 118 operates.) The successive peak values of the impulses may follow any desired envelope according to the power application regimen that has been chosen. However, these peak values may be higher that the values used in an uninterrupted power supply. Impulsive power supply with dwell periods for allowing cooling have been shown to help localize the required fusing temperature to the fusing site per se. The result is a significant improvement in avoiding propagation of high heat levels which can cause thermal stress in the resin material in which the commutator may be mounted. Also, with this type of power supply required temperatures in the parts being fused may be reached with closer tolerances, and it may also be easier to operate the control system to maintain those required temperatures. The apparatus of FIG. 8 can be readily programmed to apply power as shown in FIG. 15.

It is to be understood that when this specification or the accompanying claims speak of controlling a fusing cycle "parameter" on the basis of electrical resistance measured in the circuit including the workpiece being fused, this is not a reference to merely controlling the applied voltage and/or current during a particular fusing cycle stage in order to maintain constant the power applied during that stage (e.g., as in equation (2) above). Rather, as used herein with reference to the electrical aspects of the fusing cycle, the word "parameter" refers to more fundamental characteristics such as selection or initiation of the "constant" target power value mentioned in equation (2) or the time at which fusing power is turned on, turned off, or otherwise fundamentally changed.

It will be understood that the foregoing is only illustrative of the principles of the invention, and that various modifications can be made by those skilled in the art without departing from the scope and spirit of the invention. For example, although FIG. 8 shows a fusing power supply system which applies direct current (DC) power to the workpiece, it will be understood that other types of power supplies can be used if desired. The principles of the invention are also readily applicable to fusing workpieces of other types than those chosen for illustration in the accompanying drawings. For example, other suitable workpieces may be armature coil leads in commutator bar slots (rather than under stator bar tangs as shown herein) or stator coil leads in stator terminals.

The Invention claimed is:

1. Apparatus for performing a fusing operation which includes fusing a first electrical conductor to a second electrical conductor by applying force and heat to at least one of said conductors, said force being applied by a fusing electrode, said heat being generated by electrical power passing through an electrical circuit that includes at least a portion of said fusing electrode in series with at least a portion of said at least one of said conductors, said apparatus comprising:

means for measuring the electrical resistance of said circuit during said fusing operation; and means responsive to said means for measuring for controlling at least one parameter of said fusing operation based at least in part on the electrical resistance measured by said means for measuring and a predetermined electrical delivery function to regulate said force and heat so that at least one of said conductors is softened, insulation on a portion of one of said conductors is vaporized, at least one of said conductors is deformed to be in intimate contact with the other, and both of said conductors are bonded together, said heat being applied continuously while at least one of said conductors is softened, said insulation is vaporized, and at least one of said conductors is deformed and bonded.

2. The apparatus defined in claim 1 wherein said parameter is selected from the group consisting of the time of application said electrical power, the target level of said electrical power, the time of application of said force, the amount of said force, and the speed of application of said force.

3. The apparatus defined in claim 1 wherein said means for measuring comprises:

first means for measuring the amount of electrical current flowing through said circuit;

second means for measuring the voltage across said circuit; and means for calculating said electrical resistance by dividing said voltage by said current.

4. The apparatus defined in claim 3 further comprising:

means for determining, as a resistance correction factor, the electrical resistance of the portions of said circuit other than said conductors; and wherein said means for calculating calculates said electrical resistance by dividing said voltage by said current and subtracting said resistance correction factor.

5. Apparatus for performing a fusing operation which includes fusing a first electrical conductor to a second electrical conductor by applying force and heat to at least one of said conductors, said force being applied by a fusing electrode, and said heat being generated by passing electrical power through an electrical circuit that includes at least a portion of said fusing electrode in series with at least a portion of said at least one of said conductors, said apparatus comprising:

means for measuring the electrical resistance of said circuit during said fusing operation;

means for correcting the electrical resistance measured by said means for measuring to substantially eliminate any contribution to said measured electrical resistance which is due to resistance of portions of said circuit other than said conductors; and means responsive to said means for correcting for controlling the power passing through said circuit so that a predetermined amount of power is dissipated in said conductors by resistance heating of said conductors.

6. In a method for fusing a first electrical conductor to a second electrical conductor by applying force and heat to a spot on at least one of said conductors, said force being applied by a fusing electrode, and said heat being generated by electrical power passing through an electrical circuit that includes at least a portion of said fusing electrode in series with at least said spot, the improvement comprising the step of:

applying said electrical power to said circuit as a succession of a plurality of pulses separated by time intervals during which substantially no electrical power is applied to said circuit.

7. In a method for performing a fusing operation which includes fusing a first electrical conductor to a second electrical conductor by applying force and heat to at least one of said conductors, said force being applied by a fusing electrode, and said heat being generated by electrical power passing through an electrical circuit that includes at least a portion of said fusing electrode in series with at least a portion of said at least one of said conductors, the improvement comprising the steps of:

measuring the electrical resistance of said circuit during said fusing operation; and controlling at least one parameter of said fusing operation based at least in part on the electrical resistance measured in said measuring step and a predetermined electrical delivery function to regulate said force and heat so that at least one of said conductors is softened, insulation on a portion of one of said conductors is vaporized, at least one of said conductors is deformed to be in intimate contact with the other, and both of said conductors are bonded together, said heat being applied continuously while at least one of said conductors is softened, said insulation is vaporized, and at least one of said conductors is deformed and bonded.

8. The method defined in claim 7 wherein said parameter is selected from the group consisting of the time of application said electrical power, the target level of said electrical power, the time of application of said force, the amount of said force, and the speed of application of said force.

9. The method defined in claim 7 wherein said measuring step comprises the steps of:

measuring the amount of electrical current flowing through said circuit;

measuring the voltage across said circuit; and calculating said electrical resistance by dividing said voltage by said current.

10. The method defined in claim 9 further comprising the step of:

determining, as a resistance correction factor, the electrical resistance of the portions of said circuit other than said conductors; and wherein, in said calculating step, said electrical resistance is calculated by dividing said voltage by said current and subtracting said resistance correction factor.

11. In a method for performing a fusing operation which includes fusing a first electrical conductor to a second electrical conductor by applying force and heat to at least one of said conductors, said force being applied by a fusing electrode, and said heat being generated by passing electrical power through an electrical circuit that includes at least a portion of said fusing electrode in series with at least a portion of said at least one of said conductors, the improvement comprising the steps of:

measuring the electrical resistance of said circuit during said fusing operation;

correcting the electrical resistance measured in said measuring step to substantially eliminate any contribution to said measured electrical resistance which is due to resistance of portions of said circuit other than said conductors; and controlling the power passing through said circuit in response to the measured electrical resistance as corrected in said correcting step so that a predetermined amount of power is dissipated in said conductors by resistance heating of said conductors.

\* \* \* \* \*